United States Patent [19]

Tsukagoshi et al.

[11] 4,221,773

[45] Sep. 9, 1980

[54] METHOD OF PRODUCING A CARBON DIAPHRAGM FOR AN ACOUSTIC INSTRUMENT

[75] Inventors: Tsunehiro Tsukagoshi; Teruo Toma; Shinichi Yokozeki; Toshikazu Yoshino, all of Tokyo, Japan

[73] Assignee: Pioneer Electronic Corporation, Tokyo, Japan

[21] Appl. No.: 968,912

[22] Filed: Dec. 13, 1978

[30] Foreign Application Priority Data

Dec. 23, 1977 [JP] Japan ................................ 52-154315

[51] Int. Cl.[3] ........................ C01B 31/02; G10K 13/00

[52] U.S. Cl. .................................... 423/445; 181/167; 264/29.1; 264/29.7; 423/448; 423/449

[58] Field of Search ........................ 423/445, 448, 449; 264/29.1, 29.5, 29.6, 29.7; 181/167, 157, 173

[56] References Cited

U.S. PATENT DOCUMENTS

| | | | |
|---|---|---|---|
| 3,084,394 | 4/1963 | Bickerdike et al. | 264/29.1 |
| 3,089,195 | 5/1963 | Woodburn | 264/29.5 X |
| 3,198,714 | 8/1965 | Johnson et al. | 264/29.7 |
| 3,201,330 | 8/1965 | Price | 423/448 X |
| 3,219,731 | 11/1965 | Etzel et al. | 264/29.1 |
| 3,907,950 | 9/1975 | Bickerdike et al. | 423/449 X |
| 3,969,124 | 7/1976 | Stewart | 423/445 |

FOREIGN PATENT DOCUMENTS 52-65420 5/1977 Japan .

*Primary Examiner*—Edward J. Meros

*Attorney, Agent, or Firm*—Armstrong, Nikaido, Marmelstein & Kubovcik

[57] ABSTRACT

A method of producing a diaphragm of an acoustic instrument having the steps of blending powders of carbon such as graphite, carbon black or the like and a thermoplastic or a thermosetting resin, shaping the resultant blend into a desired form and then carbonizing the shaped blend. As a result, it has become possible to produce a diaphragm of an acoustic instrument, having a light weight, high rigidity and a large ratio of Young's modulus to density.

22 Claims, 2 Drawing Figures

METHOD OF PRODUCING A CARBON DIAPHRAGM FOR AN ACOUSTIC INSTRUMENT

BACKGROUND OF THE INVENTION

The present invention relates to a method of producing a diaphragm of an acoustic instrument, having a low density and a high elasticity. More particularly, the invention is concerned with a method of easily producing the diaphragm of an acoustic instrument, the method including blending and kneading plastic and carbon powders with each other, shaping the blend, and carbonizing the shaped blend by heating.

Generally speaking, the diaphragms of acoustic instruments, particularly the diaphragm of a speaker is required to have light weight, large rigidity and a large ratio $E/\rho$ of Young's modulus E to density $\rho$, so that it may reproduce the acoustic signal efficiently over a wide range of frequency and at a high fidelity.

For this reason, conventionally, wood pulps, plastics, aluminum, titanium and the like materials have been used as the material of the diaphragm. These conventional materials, however, could not fully meet the above requirements.

Also, it has been proposed and actually carried out to make use of carbon materials. One of these carbon materials is a composite material of carbon fibers and a plastic. This composite material, however, cannot provide sufficient rigidity, when it is formed into a tabular forms of diaphragm, partly because of insufficient binding of carbon fibers attributable to the lubricating nature of the surface of carbon fiber itself, and partly because of the large anisotropy of the carbon fibers.

Under these circumstances, the present inventors have proposed a diaphragm composed of carbonized or graphitized plastic, so as to make the most of the advantages of carbon as the diaphragm material, i.e. light weight, high rigidity and large ratio of Young's modulus E to the density $\rho$.

It is difficult, however, to carbonize or graphitize the plastic while preserving the shape of the diaphragm. At the same time, a high orientation which would ensure a high elasticity cannot be obtained unless a suitable tension is applied to the diaphragm material. In addition, the diaphragm material inconveniently exhibits a large distortion in the course of carbonization or graphitization, resulting in cracking of the diaphragm.

SUMMARY OF THE INVENTION

It is therefore a major object of the present invention to eliminate the drawbacks of the conventional methods of producing a diaphragm.

More specifically, it is an object of the invention to provide a method of producing a diaphragm of an acoustic instrument, by carbonizing or graphitizing of a plastic, in which the undesirable distortion of the diaphragm material in the course of the carbonizing or graphitizing is conveniently avoided, while preserving the advantages as the material of diaphragm of acoustic instrument, i.e. the light weight, high rigidity and large ratio $E/\rho$ of Young's modulus to density.

To this end, according to the present invention, there is provided a method of producing a diaphragm of an acoustic instrument having the steps of blending and kneading carbon powders and a plastic, shaping the blend into a desired form, and carbonizing the shaped blend.

DESCRIPTION OF THE PREFERRED EMBODIMENTS

In order to obtain a carbon material having a large Young's modulus and high mechanical strength, for use as the material of a diaphragm of an acoustic instrument, it is necessary to carbonize a raw material having a high carbon content. However, it is difficult to carbonize PVC material shaped into the form of a diaphragm, without being accompanied by distortion of the material, if the PVC is used solely. At the same time, for obtaining a high elasticity, it is necessary to enhance the graphite orientation by imparting a suitable tension to the material during carbonizing.

Since the PVC material shaped into the form of a diaphragm is likely to be distorted during carbonizing, when the PVC material is used solely, it becomes necessary to add solid powders to the PVC material. The solid powder for this purpose is most preferably powdered graphite. The addition of graphite offers the following advantages.

(1) It is possible to prevent shrinkage and distortion which are liable to occur in the preparatory baking and carbonizing.

(2) The graphite powders are orientated during the blending of the PVC and powdered graphite, so that the Young's modulus and mechanical strength are considerably improved.

(3) Carbons of goods crystallinity can be obtained, because the graphite powders constitute a nucleus of the crystals, so that Young's modulus and the mechanical strength after carbonizing are considerably improved.

In general, carbon black and carbon fiber can be used as the material added before carbonization. The carbon black, however, cannot constitute a good nucleus because it has a poor crystallization characteristic. Carbon fiber, when used as the material added before carbonizing, is preferably graphitized. The carbon fiber may constitute a good nucleus when it is cut to a length of about 5 microns or smaller. However, it is extremely difficult to cut the carbon fiber into such short pieces. Even if possible, such fibers cut into short pieces are extremely expensive and impractical.

Hereinafter, practical embodiments of the invention will be described in more detail.

Embodiment 1

Figure 1:
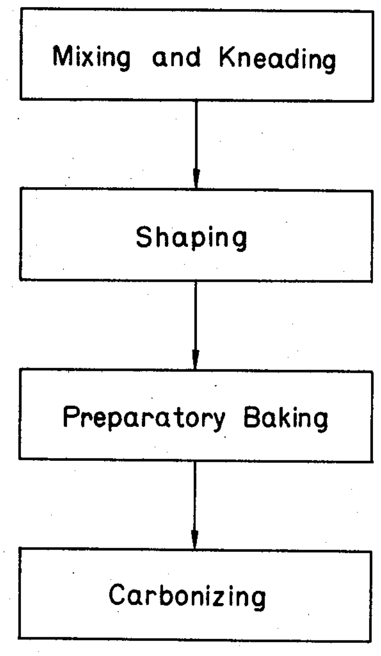
FIG. 1 is a block diagram showing the steps of the process in accordance with an embodiment of the invention.

FIG. 1 shows the steps of method in accordance with a first embodiment of the invention.

Mixing and Kneading Step

Powders of graphite (scale-like graphite) of diameters ranging between 0.1 and 50 microns are added to vinyl chloride resin. The resin and graphite powders are blended and kneaded by means of a kneader or a roller at a temperature of 130° to 200° C. The rate of addition of graphite powder is 10 to 90% by weight, preferably 40 to 70% by weight. The smaller the grain size of the graphite becomes, the better result is obtained. Thus, the grain size is preferably between 0.1 and about 5 microns. The mean grain size is preferably below 5 microns.

The blend of the vinyl chloride and powders of graphite is then sent to the subsequent step of shaping.

Shaping Step

The blend obtained is then rolled into a tabular form by means of rolls. Then, the rolled material is shaped into a desired form, e.g. dome-like or conical shape, at a temperature of its softening points, i.e., 70° to 150° C., by means of vacuum, a press, or the like.

Preparatory Baking Step

The shaped body obtained is heated in the air (oxidizing atmosphere). The temperature is raised from 80° C. at a rate of 1° to 20° C. per hour up to a temperature of 250° to 300° C., so as to oxidize the shaped body at least at the surface thereof, thereby to make the surface infusible, so that the shaped body may not be distorted in the next step of carbonizing. This treatment for making the material infusible may include a preparatory step of heating at 50° to 80° C. in ozone for 4 to 5 hours, before heating in the air.

In order to avoid a slightest possibility that the shaped body may be distorted during the heating in this step, the shaped body may be held during heating by a jig made of a metal gauze wire or a punched thin metallic web, or between jigs.

A good result is obtained by a heating for 10 hours or longer.

Carbonizing Step

The shaped body after the preparatory baking is then carbonized by heating at 1000° to 1500° C. for one hour, in a non-oxidizing atmosphere such as nitrogen, argon or the like gas. It is necessary to take a preheating step, before the shaped body is heated up to the above-mentioned carbonizing temperature. The rate of increase of the temperature at early stage has to be controlled. Preferably, the heating is made at a small rate of 1° to 20° C./hour, until the shaped body is heated to 400° C., and, thereafter, at a rate of 10° to 100° C./hour.

This small rate of temperature increase at the early stage ensures a carbide having good property, because the coarsening of the structure, which would reduce the Young's modulus and mechanical strength, is prevented by controlling the rate of temperature increase before the shaped material is heated to 400° C. After the temperature is raised beyond 400° C., the rate of temperature rise may be economically selected, because the undesirable coarsening of the structure is less likely to take place at temperatures beyond 400° C.

At the same time, in order to prevent distortion of the shaped body during carbonizing, it is preferable to mount the shaped body on a jig made of carbon or the like material having a high melting point and the desired shape, or to hold the shaped body between similar jigs, during carbonizing.

The carbonized body is directly used as the diaphragm or, as desired, subjected to processing such as removal of burrs or boring, so as to make a complete diaphragm.

The diaphragm produced from vinyl chloride resin in accordance with the method of the present invention exhibits, a specific modulus of elasticity E$\rho$ which is about 5 times as large that of a diaphragm made of aluminum, but slightly below that of a beryllium diaphragm.

Figure 2:
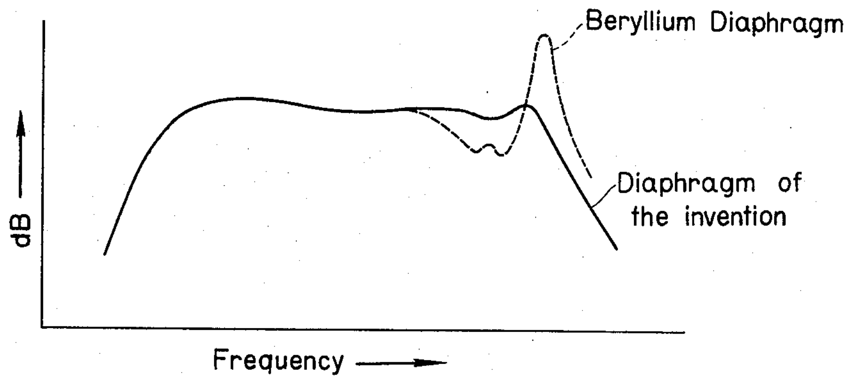
FIG. 2 is a chart showing the frequency characteristic of the diaphragm produced in accordance with the method of the invention, in comparison with that of a beryllium diaphragm.

At the same time, the diaphragm produced by the method of the present invention has an internal loss which is about 10 times as large that of the beryllium diaphragm. FIG. 2 shows the frequency characteristic of the diaphragm produced in accordance with the method of the invention as full line curve, in comparison with that of a beryllium diaphragm shown as broken line curve. The diaphragm of the present invention provides a resonance frequency at a high frequency range substantially equivalent to that of the beryllium diaphragm and flat pattern of frequency characteristic, which ensures a good frequency characteristic at a high frequency range and a superior total frequency response characteristic of the diaphragm.

| | Young's modulus E Kg/mm$^2$ | Density $\phi$ g/cm$^3$ | Specific modulus of elasticity E/$\phi$ × 10$^9$cm |
|---|---|---|---|
| aluminum | 7400 | 2.7 | 2.8 |
| beryllium | 28000 | 1.8 | 15.5 |
| carbonized blend of PVC and powdered graphite | 16000 | 1.6 | 10.6 |

Embodiment 2

A second embodiment of the invention will be described hereinafter. In the mixing and kneading step of this second embodiment, graphite powders of grain sizes of 1 to 100 microns are used as the carbon powders, while vinyl chloride is used as the plastic material. More specifically, the composition of the blend includes 20 parts by weight of graphite powders, 30 parts by weight of vinyl chloride, 10 parts by weight of plasticizer (dioctyl phthalate) and 50 parts by weight of solvent (methyl ethyl ketone), and is well blended and kneaded.

In the shaping step, the shaping of the blend into the desired form, e.g. dome or conical form, is made by means of a mold at a room temperature. Thereafter, the blend is allowed to stand or subjected to heat for drying.

In the preparatory baking step, the shaped body and the mold is put into a furnace and heated gradually up to 300° C. taking 35 hours.

Finally, carbonizing is effected by heating at 1000° C., 1 hour, in a non-oxidizing atmosphere such as argon, nitrogen or the like.

The diaphragm thus produced exhibits an extremely small distortion during carbonizing as compared with that made of only a plastic, i.e. containing no carbon, and has a density of 1.54 g/cm$^3$ and Young's modulus of 16,000 Kg/mm$^2$. Consequently, the reproduceable frequency range is widened and the distortion is reduced over the entire frequency range, so as to ensure a superior reproduceability to that of the conventional diaphragm material.

Further, this diaphragm was graphitized by heating for 5 minutes at 2400° C., in an inert atmosphere, together with a graphite mold for preventing distortion. As a result, a diaphragm exhibiting a superior characteristic, having larger density has 1.8 g/cm$^3$ and Young's modulus of 18,000 Kg/mm$^2$ was obtained.

Embodiment 3

A third embodiment of the invention will be described hereinafter.

According to this embodiment, the blend material consists of 20 parts by weight of graphite of grain size of 1 to 100 microns, 10 parts by weight of vinyl chloride resin, 1 part by weight of plasticizer (D.O.P.) and 0.2 part by weight of stabilizer (lead stearate). The blending and kneading is done by means of rolls at a temperature of softening point (a temperature which would not cause decomposition i.e. 130° to 200° C.).

In the subsequent shaping step, the blend is rolled into tabular form, as is the case of the first embodiment, so as to improve the graphite orientation, and then is shaped in conical form by means of a vacuum at the same temperature as in the preceding step. Then, the preparatory baking is effected by heating up to 300° C. in air or oxidizing atmosphere, so as to make the shaped body infusible. In the final step of carbonization, a heating is made for 1 hour at 1000° to 1200° C., under a non-oxidizing atmosphere, so as to carbonize the shaped body. A carbonizing heating temperature below 1000° C. cannot provide a sufficiently large Young's modulus, while a temperature exceeding 1200° C. cannot provide any remarkable effect over that provided by the carbonizing temperature of 1200° C. In this embodiment, the above-stated carbonization may be substituted by a graphitization occuring 5 minutes heating at 2000° to 2500° C. The diaphragm thus produced by carbonization has a Young's modulus of 16,000 Kg/mm$^2$ and a density of 1.6 g/cm$^3$. On the other hand, the diaphragm produced by graphitization has a Young's modulus of 25,000 Kg/mm$^2$ and a density of 1.8 g/cm$^3$.

Embodiment 4

A fourth embodiment of the invention will be described hereinafter. In the blending step, 10 parts by weight of furan resin, 20 parts by weight of graphite and 0.2 part by weight of hardening agent are blended and kneaded by means of a kneader. Thereafter, the blend is shaped at a temperature of 150° C. or so, by means of a mold. In the carbonizing step, the shaped body was heated at 1200° C. for 1 hour, within a non-oxidizing atmosphere. Young's modulus E of 10,000 Kg/mm$^2$ and density of 1.7 g/cm$^3$ were obtained.

In this embodiment, it is not necessary to take the step of preparatory baking for making the shaped body infusible, because the plastic used is a thermosetting resin.

The plastic as used in the method of the present invention should have a high carbon content, whether it may be a thermoplastic or thermosetting resin. Thus, in addition to the described vinyl chloride, styrol, silicone and other vinyl resins are advantageously used as the plastic material. Further, it is possible to use, solely or in combination, acryl, phenol, furan, urea, and other resins.

As acryl resin, 10 to 90% by weight of polymethyl methacrylate (PMMA) is blended with 90 to 10% by weight of graphite and kneaded. After kneading, the blend is shaped at a temperature of 140° to 150° C. A preparatory baking and carbonizing are effected under the same condition as in Embodiment 3.

As silicone resin, 10 to 90% by weight of trimethylchlorosilane compound is blended with 90 to 10% by weight of graphite. The blend is shaped by means of a mold having a molding pressure of 70 Kg/cm$^2$ at a temperature of 110° to 120° C. for less than 10 minutes. Carbonizing is effected under the same condition as in Embodiment 3.

As phenol resin, 42 to 45% by weight of phenolformaldehyde resin (novolak) is blended with 42 to 45% by weight of graphite and 10 to 16% by weight of hardenning agent (hexamethylenetetramine). The blend is shaped at a temperature of 100° to 110° C. by means of a mold having a molding pressure of 5 to 10 Kg/cm$^2$. Carbonizing is effected under the same condition as in Embodiment 3.

As urea resin, about 35% by weight of dimethylol urea and about 35% by weight of monomethylol urea are blended with about 30% by weight of graphite. The blend is shaped by means of a mold having a molding pressure of 100 to 300 Kg/cm$^2$ for one minute at a temperature of 130° to 150° C. Carbonizing is effected under the same condition as in Embodiment 3.

As furan resin, 10 to 90 parts by weight of furfuryl alcohol is blended with 90 to 10 parts by weight of graphite. The blend is shaped in a soft condition by adding 1 to 2 parts by weight of sulfonic acid at a temperature of about 30° C., by means of a mold having a molding pressure of 5 to 10 Kg/cm$^2$ for 24 hours. Thereafter, the temperature is raised up to 80° C. and it is allowed to stand for 24 to 48 hours. Carbonizing is effected under the same condition as in Embodiment 3.

It is possible to use carbon black as the material of the carbon powder.

The kinds of plasticizer, solvent and so forth are suitably selected in consideration of the kind of the plastic. Also, the condition of heat treatment for carbonizing or graphitizing is suitably adjusted and changed in view of the composition of blend of the plastic, plasticizer and solvent.

As has been described, according to the production method of the present invention, the distortion of the the plastic in the preparatory baking and carbonizing steps can be avoided, and dome or conical diaphragms for acoustic instruments such as speaker, microphone and so forth can be produced with high precision and good yield. In addition, since the powder material used for the production consists of carbon, it is possible to adopt a high heating temperature in the course of the graphitizing, so that the Young's modulus E or the specific modulus of elasticity $E/\rho$ is considerably increased to ensure a good frequency characteristic of the diaphragm.

What is claimed is:

1. A method of producing a diaphragm of an acoustic instrument comprising the steps of blending and kneading scale-like graphite powder and a thermoplastic resin with each other, rolling the resulting blend into a plate form to orient the graphite, making the plate form infusible by baking the form, and carbonizing the rolled blend, thereby producing a diaphragm which is substantially distortion-free and has a high specific modulus of elasticity.

2. A method as claimed in claim 1, wherein said scale-like graphite powder has a grain size of 0.1 to 100 microns.

3. A method as claimed in claim 1, wherein said scale-like graphite powder has a grain size of 0.1 to 5 microns.

4. A method as claimed in claim 1, wherein said blend includes 10 to 90 parts by weight of graphite and 90 to 10 parts by weight of the resin.

5. A method as claimed in claim 1, wherein said blend preferably includes 40 to 70 parts by weight of graphite and 60 to 30 parts by weight of the resin.

6. A method as claimed in claim 1, wherein said thermoplastic resin is a resin selected from a group consisting of vinyl, silicone, and acryl resins.

7. A method as claimed in claim 6, wherein said vinyl resin is selected from a group consisting of vinyl chloride and styrene.

8. A method as claimed in claim 6, wherein said silicone resin includes trimethylchlorosilane compound.

9. A method as claimed in claim 6, wherein said acryl resin includes polymethyl methacrylate.

10. A method as claimed in claim 1, wherein said blend includes about 1.9 to about 25% by weight of plasticizer.

11. A method as claimed in claim 1, wherein said blend includes about 45 to about 61% by weight of solvent.

12. A method as claimed in claim 1, wherein said blend includes a stabilizer in an amount sufficient to provide the stabilizing effect.

13. A method as claimed in claim 1, wherein said carbonizing step includes a step of heating the plate form at 1000° to 1500° C. for one hour, in a non-oxidizing atmosphere.

14. A method as claimed in claim 13, wherein said baking step comprises raising the temperature in an oxidizing atmosphere at a rate of 1° to 20° C./hour up to 400° C. and at a rate of 10° to 100° C. thereafter.

15. A method as claimed in claim 1 further comprising after said rolling, shaping of said plate form by vacuum, or a press at a temperature of the softening point of the blend.

16. A diaphragm for use in an acoustic instrument, said diaphragm being made by a process comprising blending and kneading scale like graphite powder with a thermoplastic resin, rolling the resulting blend into a plate form, making the plate form infusible by baking the form and carbonizing the rolled blend wherein the graphite scales are oriented and the diaphragm is substantially distortion-free and has a high specific modulus of elasticity.

17. The diaphragm of claim 16 wherein said blend includes 10 to 90 parts by weight of graphite having a particle size of 0.1 to 100 microns and 90 to 10 parts by weight of said thermoplastic resin.

18. A diaphragm of claim 16 wherein said baking step comprises increasing the temperature in an oxidizing atmosphere at a rate of 1° to 20°/hour up to 400° C. and at a rate of 10° to 100° C. thereafter.

19. The diaphragm of claim 17 wherein said blend includes 40–70 parts by weight of graphite having a particle size of 0.1 to 5 microns and 60 to 30 parts by weight of the resin.

20. The diaphragm of claim 16 wherein said thermoplastic resin is selected from the group consisting of vinyl, silicone and acryl resins.

21. The diaphragm of claim 20 wherein said resin is selected from the group consisting of vinyl chloride, styrene, trimethylchlorosilane, and polymethyl methacrylate.

22. The diaphragm of claim 16 wherein said blend further includes about 1.9% to 25% by weight of a plasticizer and a stabilizing amount of a stabilizer.

* * * * *